United States Patent
Fujimatsu et al.

(10) Patent No.: US 9,560,321 B2
(45) Date of Patent: Jan. 31, 2017

(54) IMAGE CAPTURING SYSTEM, CAMERA CONTROL DEVICE FOR USE THEREIN, IMAGE CAPTURING METHOD, CAMERA CONTROL METHOD, AND COMPUTER PROGRAM

(75) Inventors: Takeshi Fujimatsu, Kanagawa (JP); Hirofumi Fujii, Kanagawa (JP); Takayuki Matsukawa, Kanagawa (JP); Sumio Yokomitsu, Tokyo (JP); Takeshi Watanabe, Kanagawa (JP); Yuichi Matsumoto, Kanagawa (JP); Katsunori Waragai, Kanagawa (JP); Michio Miwa, Chiba (JP); Masataka Sugiura, Tokyo (JP); Mikio Morioka, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 324 days.

(21) Appl. No.: 13/978,551

(22) PCT Filed: Jan. 11, 2012

(86) PCT No.: PCT/JP2012/000118
§ 371 (c)(1),
(2), (4) Date: Jul. 8, 2013

(87) PCT Pub. No.: WO2012/096166
PCT Pub. Date: Jul. 19, 2012

(65) Prior Publication Data
US 2013/0278774 A1    Oct. 24, 2013

(30) Foreign Application Priority Data

Jan. 11, 2011  (JP) ................................ 2011-002745

(51) Int. Cl.
*H04N 7/18* (2006.01)
*G08B 13/196* (2006.01)
(Continued)

(52) U.S. Cl.
CPC .......... *H04N 7/18* (2013.01); *G08B 13/19645* (2013.01); *H04N 5/232* (2013.01);
(Continued)

(58) Field of Classification Search
CPC .......... H04N 7/18; H04N 5/232; H04N 7/181; H04N 7/185; H04N 5/247; G08B 13/19645
(Continued)

(56) References Cited

U.S. PATENT DOCUMENTS

2006/0066723 A1* 3/2006 Iwase et al. ................... 348/169
2010/0002071 A1* 1/2010 Ahiska ............................ 348/36
(Continued)

FOREIGN PATENT DOCUMENTS

CN   101404757   4/2009
JP   2002-204444  7/2002
(Continued)

OTHER PUBLICATIONS

International Search Report and Written Opinion, mail date is Apr. 24, 2012, together with an English language translation thereof.
(Continued)

*Primary Examiner* — Thai Tran
*Assistant Examiner* — Nien-Ru Yang
(74) *Attorney, Agent, or Firm* — Greenblum & Bernstein, P.L.C.

(57) ABSTRACT

Each camera comprises an image generation unit for generating an image by capturing the image, a moving object detection unit for detecting a moving object from the image and transmitting information on the position of the moving object to the server, and an image transmission unit for, when the camera is selected by the server, transmitting an image. The server comprises an image delivery camera selection unit for selecting some cameras as image delivery
(Continued)

cameras from among the cameras based on the information on the position of the moving object transmitted from each of the cameras, an image delivery camera notification unit for notifying the selection result to the cameras, and an image input unit for inputting the images transmitted from the image delivery cameras.

17 Claims, 16 Drawing Sheets

(51) Int. Cl.
  *H04N 5/232* (2006.01)
  *H04N 5/247* (2006.01)
(52) U.S. Cl.
  CPC ............. *H04N 5/247* (2013.01); *H04N 7/181* (2013.01); *H04N 7/185* (2013.01)
(58) Field of Classification Search
  USPC ........................................................ 348/159
  See application file for complete search history.

(56) References Cited

U.S. PATENT DOCUMENTS

2010/0265331 A1* 10/2010 Tanaka ............. G08B 13/19602
  348/159
2010/0321473 A1* 12/2010 An ...................... H04N 5/2628
  348/47
2012/0206607 A1 8/2012 Morioka

FOREIGN PATENT DOCUMENTS

JP 2005-142683 6/2005
JP 2005-323046 11/2005

OTHER PUBLICATIONS

Office Action issued in China Counterpart Patent Appl. No. 201280005160.4, dated Dec. 3, 2015, along with an English translation thereof.

* cited by examiner

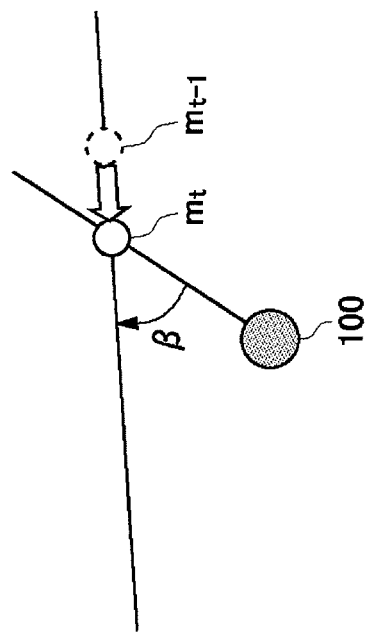
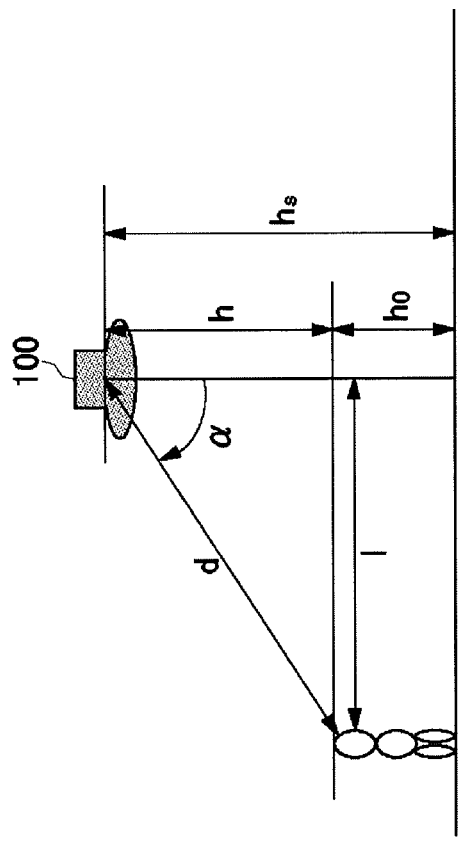
Fig.3A
Fig.3B

IMAGE CAPTURING SYSTEM, CAMERA CONTROL DEVICE FOR USE THEREIN, IMAGE CAPTURING METHOD, CAMERA CONTROL METHOD, AND COMPUTER PROGRAM

RELATED APPLICATION

The present application claims the benefit of Patent Application No. 2011-002745 filed on Jan. 11, 2011, in Japan, the contents of which are incorporated herein by reference.

TECHNICAL FIELD

The present invention relates to an image capturing system for capturing images by use of a plurality of cameras and a camera control device for controlling the cameras, and particularly to an image capturing system and a camera control device in which a plurality of cameras are all-around cameras whose image-capturing ranges mutually overlap.

BACKGROUND ART

Conventionally, in an image capturing system used as a monitor system, a plurality of cameras are provided at higher positions than a target to be monitored, and the cameras are connected to a camera control device. The images captured by the cameras are transmitted to the camera control device. The camera control device is provided with a monitor and the monitor displays the images captured by the cameras thereon. In such a monitor system, a plurality of cameras may be installed to mutually overlap in their image-capturing ranges. In this case, the camera control device can select and display optimum images suitable for display from among the images captured by the cameras.

Patent Literature 1 discloses the image capturing system therein. In Patent Literature 1, the camera control device acquires images from a plurality of cameras connected thereto, and selects a camera which captures an image in which a person faces front among the images of the cameras. Then, a signal for controlling an image capturing direction is transmitted to the selected camera in order to enable the selected image to be enlarged for display or to enable the selected camera to shoot persons.

On the other hand, an all-around camera for capturing all-around images by use of a fish-eye lens is used as a monitor camera. Since the all-around camera uses a fish-eye lens so that circular or donut-shaped images can be obtained and distortions occur in the captured images, when a captured image is displayed, a predetermined range is cut out to be subjected to distortion correction, thereby being displayed as a plan image. The all-around camera has a horizontal angle of 360 degrees and a vertical angle of about 180 degrees thereby to capture images in a wide range, and thus is used as a monitor camera in many cases.

CITATION LITERATURE LIST

Patent Literature

Patent Literature 1: JP 2005-142683 A

SUMMARY OF INVENTION

Technical Problem

However, in the image capturing system in Patent Literature 1, all the cameras always transmit images to the camera control device, and thus the amount of data to be transmitted from the cameras to the camera control device increases and loads are burdened on a network.

In the image capturing system in Patent Literature 1, the cameras use cameras using a typical lens. On the other hand, an all-around camera for capturing all-around images by use of a fish-eye lens may be used for the monitor camera as described above, and in this case, the all-around camera is installed to face downward at a higher position than a target to be monitored.

When the all-around camera is applied to the image capturing system in Patent Literature 1, the following problems are caused due to the property of the all-around camera. At first, a distortion occurs in an image captured by the all-around camera as described above, and the distortion is larger farther away from the center of the image (as a horizontal distance from the object to the camera is larger). Thus, when an image is selected only because a person to be monitored faces front relative to the camera, an optimum image cannot be necessarily selected.

When the all-around camera is installed to face downward at a higher position than a target to be monitored, even if the person to be monitored faces front in the horizontal direction relative to the all-around camera, the top of the head of the person is captured if the person is present under the all-around camera, and the person is difficult to recognize from the image. Thus, in terms of it, when an image is selected only because the person to be monitored faces front, an optimum image cannot be necessarily selected.

The present invention has been made in terms of the above problems, and it is an object thereof to provide an image capturing system capable of reducing communication traffics between a plurality of cameras and a camera control device in the image capturing system including the camera control device and the cameras connected thereto. It is an object of the present invention to provide an image capturing system capable of selecting an appropriate camera from among a plurality of cameras in the image capturing system.

Solution to Problem

In order to solve the conventional problems, an image capturing system according to the present invention includes a camera control device and a plurality of cameras connected to the camera control device, wherein each of the cameras comprises an image generation unit for generating an image by capturing the image, a moving object detection unit for detecting a moving object from the image generated by the image generation unit and transmitting information on the position of the moving object to the camera control device, and an image transmission unit for, when the camera is selected by the camera control device, transmitting an image including the moving object, and the camera control device comprises an image delivery camera selection unit for selecting, based on the information on the position transmitted from each of the cameras, some cameras among the cameras as image delivery cameras, an image delivery camera notification unit for notifying the selection result by the image delivery camera selection unit to the cameras, and an image input unit for inputting the images transmitted from the cameras selected as the image delivery cameras by the image delivery camera selection unit.

An image capturing system according to another aspect of the present invention is an image capturing system including a camera control device and a plurality of cameras connected to the camera control device, wherein each of the cameras comprises an image generation unit for generan image by capturing the image, and an image transmission unit for transmitting the image generated by the image generation unit to the camera control device, the camera control device comprises an image input unit for inputting the image transmitted from the camera, and an image recognition unit for performing a recognition processing on the moving object in the image based on the image input in the image input unit, and the image capturing system further comprises a detection unit for detecting the moving object from the image generated by the image generation unit, and a determination unit for determining an image of which camera among the cameras is to be recognized in the image recognition unit based on an angle evaluation value for an angle of the moving object relative to the camera.

Another aspect of the present invention is a camera control device which is connected to a plurality of cameras and controls the cameras, and the camera control device comprises an image delivery camera selection unit for selecting some cameras as image delivery cameras from among the cameras based on the position of each moving object detected by each camera, wherein the position is transmitted from each of the cameras, an image delivery camera notification unit for notifying the selection result by the image delivery camera selection unit to the cameras, and an image input unit for inputting images transmitted from the cameras selected as the image delivery cameras by the image delivery camera selection unit.

Still another aspect of the present invention is an image capturing method in an image capturing system including a camera control device and a plurality of cameras connected to the camera control device, and the image capturing method comprises an image generation step of generating an image by capturing the image in each of the cameras, a moving object detection step of detecting a moving object from the image generated in the image generation step in each of the cameras, a position information transmission step of transmitting information on the position of the moving object to the camera control device from each of the cameras, an image delivery camera selection step of selecting some cameras as image delivery cameras from among the cameras based on the information on the position transmitted from each of the cameras in the camera control device, an image delivery camera notification step of notifying the selection result in the image delivery camera selection step to the cameras, an image transmission step of transmitting images containing the moving object from the cameras selected in the image delivery camera selection step to the camera control device, and an image input step of inputting the images transmitted in the image transmission step in the camera control device.

Still another aspect of the present invention is a camera control method in a camera control device which is connected to a plurality of cameras and controls the cameras, and the camera control method comprises an image delivery camera selection step of selecting some cameras as image delivery cameras from among the cameras based on the position of each moving object transmitted from each of the cameras and detected in each camera, an image delivery camera notification step of notifying the selection result in an image delivery camera selection step to the cameras, and an image input step of inputting the images transmitted from the cameras selected as the image delivery cameras in the image delivery camera selection step.

Still another aspect of the present invention is a computer program for causing a computer to perform the camera control method.

Advantageous Effects of Invention

According to the present invention, a plurality of cameras transmit information on the positions of a moving object in order to select image delivery cameras, and each camera transmits images to the camera control device when it is selected as an image delivery camera, and thus the amount of data for communication between the cameras and the camera control device can be reduced.

Other aspects of the present invention are present as described later. Thus, the disclosure of the present invention intends to provide part of the present invention and does not intend to limit the scope of the invention described and claimed herein.

BRIEF DESCRIPTION OF DRAWINGS

FIG. 3(A) is a diagram for explaining a distance d from a camera to the head of a person and an orientation $\alpha$ of the face tilted to the camera according to the embodiment of the present invention; FIG. 3(B) is a diagram for explaining an orientation $\beta$ of the face horizontal to the camera according to the embodiment of the present invention.

DESCRIPTION OF EMBODIMENTS

Figure 1:
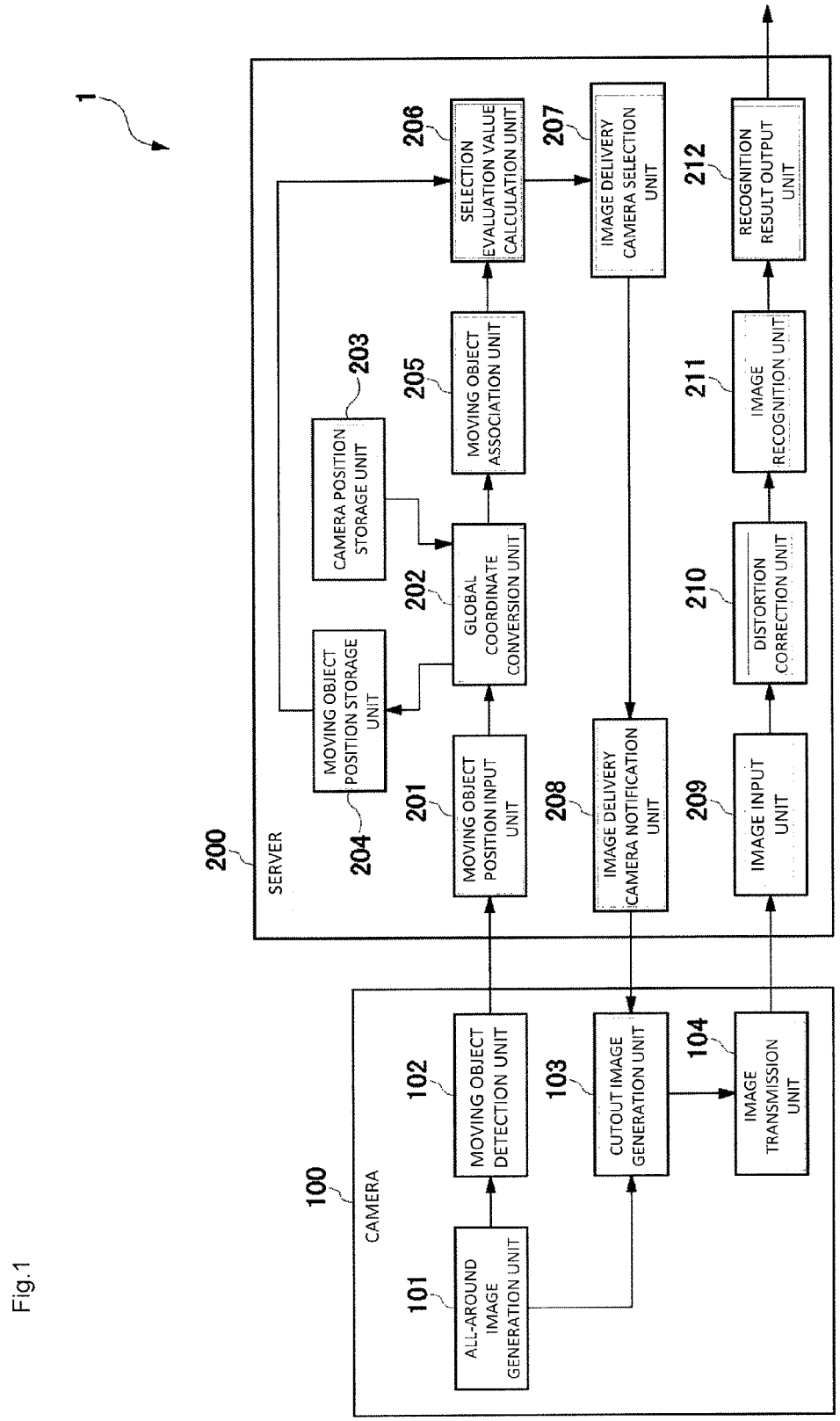
FIG. 1 is a block diagram illustrating a structure of an image capturing system according to an embodiment of the present invention.

The present invention will be described below in detail. The embodiment described below is merely an example of the present invention, and the present invention may be variously modified in various aspects. Thus, specific structures and functions disclosed in the following do not intend to limit the scope of claims.

An image capturing system according to the embodiment of the present invention includes a camera control device and a plurality of cameras connected to the camera control device, each of the cameras has an image generation unit for generating an image by capturing the image, a moving object detection unit for detecting a moving object from the image generated in the image generation unit, and transmitting information on the position of the moving object to the camera control device, and an image transmission unit for, when the camera is selected by the camera control device, transmitting an image containing the moving object, and the camera control device has an image delivery camera selection unit for selecting some cameras as image delivery cameras from among the cameras based on the information on the position transmitted from each of the cameras, an image delivery camera notification unit for notifying the selection result by the image delivery camera selection unit to the cameras, and an image input unit for inputting the images transmitted from the cameras selected as the image delivery cameras by the image delivery camera selection unit.

With the structure, since the information on the positions of the moving object is transmitted from the cameras in order to select the image delivery cameras, and each camera transmits the image to the camera control device when it is selected as the image delivery camera, the amount of data for communication between the cameras and the camera control device can be reduced.

In the image capturing system, the cameras may be installed to face downward at higher positions of a target to be captured such that mutual image-capturing ranges at least partially overlap, the image generation unit may generate all-around images by use of a fish-eye lens, and the image delivery camera selection unit may find a position relationship evaluation value for a position relationship between the camera and the moving object, and at angle evaluation value for an orientation of the moving object relative to the camera based on the position of each moving object detected by the moving object detection unit in each of the cameras, thereby to select the image deliver cameras based on the position relationship evaluation value and the angle evaluation value.

With the structure, the image delivery cameras are selected in total consideration of multiple factors including the orientation of the moving object relative to the camera (whether the moving object faces front) and the position relationship between the camera and the moving object, and thus appropriate cameras suitable for the purpose can be selected as the image delivery cameras from the cameras.

In the image capturing system, the image transmission unit may transmit an image of a partial region containing the moving object in the images generated by the image generation unit.

With the structure, the amount of data for communication between the cameras and the camera control device can be reduced.

In the image capturing system, the camera control device may further comprise an image recognition unit for performing a recognition processing on the moving object based on the image input by the image input unit, and the image delivery camera selection unit may select cameras suitable for the recognition processing in the image recognition unit as the image delivery cameras from among the cameras.

With the structure, the recognition processing on the moving object can be performed by the image suitable for the recognition processing among the images captured by the cameras, thereby enhancing a recognition accuracy.

The image capturing system according to the embodiment of the present invention includes a camera control device and a plurality of cameras connected to the camera control device, each of the cameras comprises an image generation unit for generating an image by capturing the image, and an image transmission unit for transmitting the image generated in the image generation unit to the camera control device, the camera control device comprises an image input unit for inputting the image transmitted from the camera, and an image recognition unit for performing a recognition processing on a moving object in the image based on the image input in the image input unit, and the image capturing system further comprises a detection unit for detecting a moving object from the image generated in the image generation unit, and a determination unit for determining the image of which camera among the cameras is to be subjected to the recognition processing in the image recognition unit based on an angle evaluation value for an orientation of the moving object relative to the camera.

With the structure, the recognition processing can be performed on an image in which the moving object is captured at a desired angle, thereby enhancing an accuracy of recognizing the moving object.

In the image capturing system, the determination unit may calculate the angle evaluation value based on a moving direction of the moving object.

With the structure, the moving direction of the moving object can be assumed as the orientation of the moving object.

In the image capturing system, the determination unit may calculate the angle evaluation value by the recognition processing on the image generated in the image generation unit.

With the structure, an image in which the moving object is captured at a desired angle can be determined by the recognition processing on the image of each camera.

Another aspect of the present invention is a camera control device which is connected to a plurality of cameras and controls the cameras, and the camera control device comprises an image delivery camera selection unit for selecting some cameras as image delivery cameras from among the cameras based on the position of each moving object detected by each camera, wherein the position is transmitted from each of the cameras, an image delivery camera notification unit for notifying the selection result by the image delivery camera selection unit to the cameras, and an image input unit for inputting the images transmitted from the cameras selected as the image delivery cameras by the image delivery camera selection unit.

With the structure, since the positions of the moving object is transmitted from the cameras in order to select the image delivery cameras, and each camera transmits the image to the camera control device when it is selected as the image delivery camera, the amount of data for communication between the cameras and the camera control device can be reduced.

Still another aspect of the present invention is an image capturing method in an image capturing system including a camera control device and a plurality of cameras connected to the camera control device, and the image capturing method includes an image generation step of generating an image by capturing the image in each of the cameras, a moving object detection step of detecting a moving object from the image generated in the image generation step in each of the cameras, a position information transmission step of transmitting information on the position of the moving object from each of the cameras to the camera control device, an image delivery camera selection step of selecting some cameras as image delivery cameras from among the cameras based on the information on the position transmitted from each of the cameras in the camera control device, an image delivery camera notification step of notifying the selection result in the image delivery camera selection step to the cameras, an image transmission step of transmitting images containing the moving object from the cameras selected in the image delivery camera selection step to the camera control device, and an image input step of inputting the images transmitted in the image transmission step in the camera control device.

With the structure, since the information on the positions of the moving object is transmitted from the cameras in order to select the image delivery cameras, and each camera transmits the image to the camera control device when it is selected as the image delivery camera, the amount of data for communication between the cameras and the camera control device can be reduced.

Still another aspect of the present invention is a camera control method in a camera control device which is connected to a plurality of cameras and controls the cameras, and the camera control method includes an image delivery camera selection step of selecting some cameras as image delivery cameras from among the cameras based on the position of each moving object transmitted from each of the cameras and detected in each camera, an image delivery camera notification step of notifying the selection result in the image delivery camera selection step to the cameras, and an image input step of inputting the images transmitted from the cameras selected as the image delivery cameras in the image delivery camera selection step.

With the structure, since the positions of the moving object is transmitted from the cameras in order to select the image delivery cameras, and each camera transmits the image to the camera control device when it is selected as the image delivery camera, the amount of data for communication between the cameras and the camera control device can be reduced.

Still another aspect of the present invention is a computer program for causing a computer to perform the camera control method.

The embodiments of the present invention will be described below with reference to the drawings.

Figure 2:
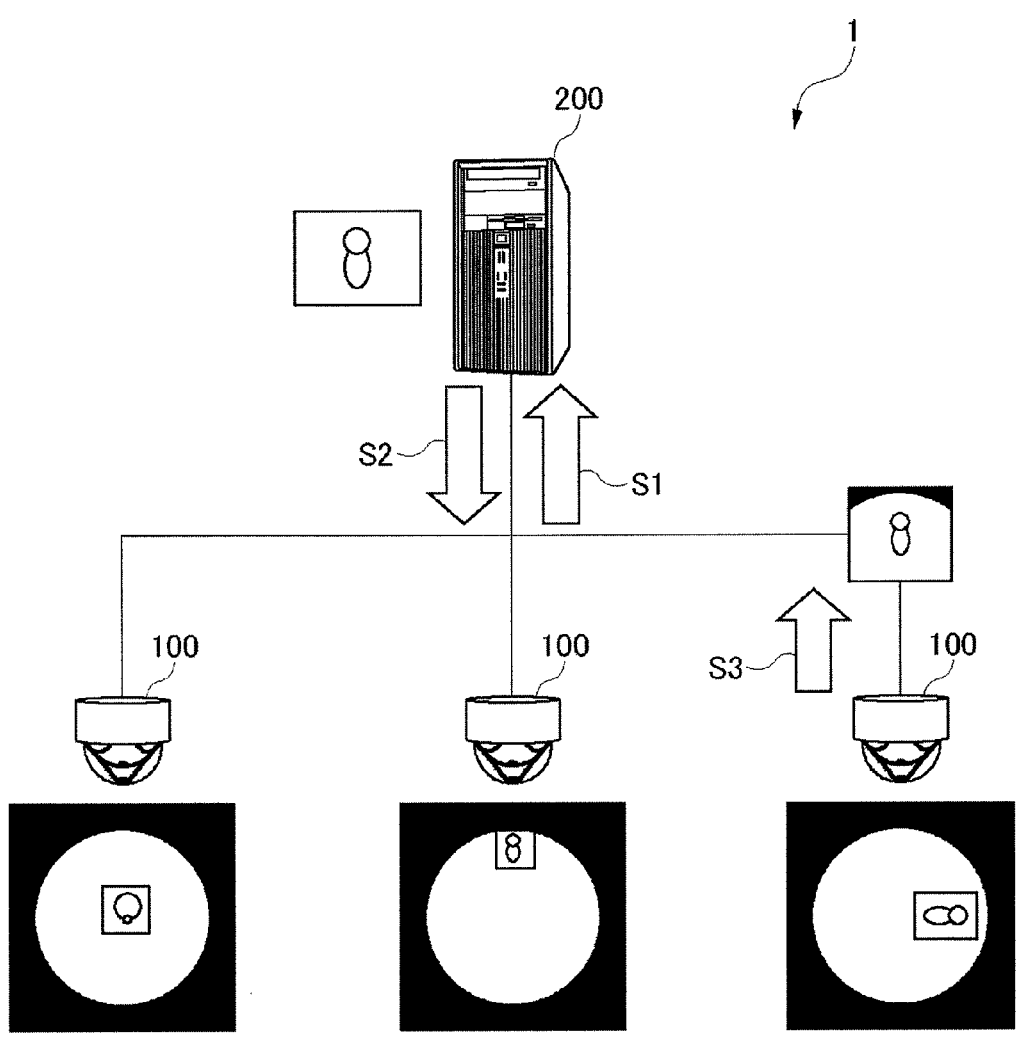
FIG. 2 is a configuration diagram of the image capturing system according to the embodiment of the present invention.

FIG. 1 is a block diagram illustrating a structure of an image capturing system according to the embodiment of the present invention. FIG. 2 is a configuration diagram of the image capturing system according to the embodiment of the present invention. An outline of the image capturing system according to the embodiment of the present invention will be described first with reference to FIG. 2. An example in which the image capturing system according to the present invention is applied as a monitor system will be described below, but the image capturing system according to the present invention is not limited to the monitor system.

As illustrated in FIG. 2, an image capturing system 1 according to the present embodiment is configured such that a server 200 and a plurality of cameras 100 are connected to each other. The server 200 corresponds to the camera control device according to the present invention. The cameras 100 are installed to face downward at higher positions of a target to be monitored, respectively. The cameras 100 mutually overlap in at least part of image-capturing ranges. The camera 100 is an all-around camera employing a fish-eye lens, which has a horizontal angle of 360 degrees and a vertical angle of about 180 degrees.

The camera 100 generates a circular all-around image by capturing the image under each camera 100 as illustrated in FIG. 2. The all-around image is larger in its distortion toward the outside of the circle. When capturing and generating an all-around image, each camera 100 detects a moving object from the all-around image, and transmits information on the position of the detected moving object in the all-around image to the server 200 (step S1). The server 200 acquires the information on the position of the moving object in the all-around image from each camera 100, selects cameras (which will be denoted as "image delivery cameras") for delivering the image, and notifies the selection result to the cameras 100 (step S2).

The selected cameras 100 each cut out a region containing the detected moving object in the all-around image (the image cut out will be denoted as "cutout image" below), and transmit it to the server 200 (step S3). The server 200 corrects the distortion of the cutout image, generates a plan image, displays the plan image, and performs an image processing (person authentication) by use of the plan image.

The structures of the cameras 100 and the server 200 configuring the image capturing system 1 according to the present embodiment will be described below in detail with reference to FIG. 1. As explained in FIG. 2, in the image capturing system 1, the cameras 100 are connected to the server 200, but one of the cameras 100 is illustrated as a representative in FIG. 1.

The camera 100 comprises an all-around image generation unit 101, a moving object detection unit 102, a cutout image generation unit 103 and an image transmission unit 104. The server 200 comprises a moving object position input unit 201, a global coordinate conversion unit 202, a camera position storage unit 203, a moving object position storage unit 204, a moving object association unit 205, a selection evaluation value calculation unit 206, and an image delivery camera selection unit 207, and selects image delivery cameras by the structure. The server 200 further comprises an image delivery camera notification unit 208, an image input unit 209, a distortion correction unit 210, an image recognition unit 211 and a recognition result output unit 212.

The structure of the camera 100 will be described first. The all-around image generation unit 101 comprises a fish-eye lens, an imaging device, a signal processing circuit and the like, and captures an image thereby to generate an all-around image. The all-around image generation unit 101 captures an image at a predetermined frame rate thereby to generate an all-around image. The generated all-around image is output to the moving object detection unit 102 and the cutout image generation unit 103.

The moving object detection unit 102 acquires the all-around image from the all-around image generation unit 101, and detects a moving object therefrom. In order to do it, when being input with the all-around image from the all-around image generation unit 101, the moving object detection unit 102 stores it up to a next frame. Thus, the moving object detection unit 102 stores therein the all-around image of the previous frame. The moving object detection unit 102 takes a difference between the all-around image of the previous frame and the all-around image of the current frame, and detects a portion where the difference reaches a predetermined threshold or more as a moving object.

When detecting the moving object, the moving object detection unit 102 outputs information on the position of the moving object in the all-around image. When detecting a plurality of moving objects, the moving object detection unit 102 outputs information on the positions. The position of the moving object in the all-around image can be defined by an orientation θ from the center of the all-around image and a distance r from the center of the all-around image, and thus the information on the position of the moving object includes information on the orientation θ and the distance r. The information on the position of the moving object further includes information for specifying a camera and information for specifying a frame.

When receiving the notification that the camera is selected as an image delivery camera from the server 200, the cutout image generation unit 103 generates a cutout image with a predetermined region containing the moving object in the all-around image for the frame as a cutout region. The image transmission unit 104 transmits the cutout image generated in the cutout image generation unit 103 to the server 200. The cutout image generation unit 103 uses the information on the position of the moving object detected by the moving object detection unit 102 to find the cutout region. When a plurality of moving objects are detected, the server 200 may designate information on the position to be cut out.

The structure of the server 200 will be described below. The moving object position input unit 201 inputs the information on the position of the moving object transmitted from the moving object detection unit 102 in the camera 100. The moving object position input unit 201 inputs the information on the position of the moving object from each of the cameras 100 connected to the server 200. The information on the position of the moving object input into the moving object position input unit 201 is output to the global coordinate conversion unit 202.

The global coordinate conversion unit 202 converts the position of the moving object into a global coordinate based on the information on the position of the moving object transmitted from the cameras 100. In order to do it, the camera position storage unit 203 stores therein the information on the respective positions of the cameras 100. The global coordinate conversion unit 202 combines the information on the position of the moving object acquired from each camera 100 and the information on the position of the corresponding camera 100 stored in the camera position storage unit 203 thereby to calculate a position of the moving object on the global coordinate.

The calculated position of the moving object on the global coordinate is output to the moving object association unit 205 and is stored in the moving object position storage unit 204. The moving object position storage unit 204 stores therein the information on the position of the moving object on the global coordinate per camera and per frame.

The moving object association unit 205 mutually compares the positions of the moving object on the global coordinate detected by the cameras 100 for the same frame thereby to determine whether the moving object detected in each of the cameras 100 is the same moving object. The moving object association unit 205 determines that a moving object within a predetermined error distance on the global coordinate is the same moving object. The moving object association unit 205 mutually associates the global coordinates of the same moving objects and outputs them to the selection evaluation value calculation unit 206.

For example, assuming four cameras 100 connected to the server 200, when the moving objects detected from the all-around images of the three cameras are determined as the same moving objects and the moving object detected from the all-around image of the remaining camera is not the same, the moving object association unit 205 associates the moving objects detected from the all-around images of the three cameras and outputs them to the selection evaluation value calculation unit 206. For example, when the information on the positions of multiple moving objects per all-around image is input from the camera 100, the moving object association unit 205 associates the respective moving objects.

The selection evaluation value calculation unit 206 calculates an evaluation value for selecting an image delivery camera (which will be denoted as "selection evaluation value" below). A selection evaluation value y is calculated assuming that the moving object is a person having a certain height and moves front. The selection evaluation value y is calculated based on an evaluation value f1 of a distance d from the camera to the head of the person, an evaluation value f2 of an orientation (angle) α of the face tilted to the camera, and an evaluation value f3 of an orientation (angle) β of the face horizontal to the camera (in the pan direction). Specifically, the selection evaluation value y is calculated by the following equation (1).

$$Y = f1(d) \times f2(\alpha) \times f3(\beta) \tag{1}$$

FIG. 3(A) is a diagram for explaining the distance d from the camera to the head of the person and the orientation α of the face tilted to the camera, and FIG. 3(B) is a diagram for explaining the orientation β of the face horizontal to the camera. As illustrated in FIG. 3(A), assuming the height hs of the position where the camera is installed and the height h0 of the head of the person, h=hs−h0 and the following equation (2) are established.

$$\cos \alpha = d/h \tag{2}$$

The orientation α of the face tilted to the camera can be calculated based on the distance r from the center of the all-around image to the moving object input from the moving object position storage unit 204. That is, as the distance r is longer, the orientation α of the face tilted to the camera is larger. The selection evaluation value calculation unit 206 has a table defining a correspondence between the distance r and the angle α, and the angle α is calculated from the distance r with reference to the table.

The selection evaluation value calculation unit 206 may calculate the orientation α of the face tilted to the camera by use of the information on the position of the moving object on the global coordinate input from the moving object association unit 205. In this case, as illustrated in FIG. 3(A), a horizontal distance l from the camera to the moving object is calculated based on the information on the position of the moving object on the global coordinate, and the orientation α of the face tilted to the camera can be calculated in the following equation (3).

$$\alpha = \arctan(l/h) \quad (3)$$

The selection evaluation value calculation unit 206 may calculate the distance d from the camera to the head of the person in the equation (2) by use of the orientation α calculated as described above. The selection evaluation value calculation unit 206 has the table defining the distance d corresponding to the orientation α, and may calculate the distance d with reference to the table. The selection evaluation value calculation unit 206 may calculate the distance d from the camera to the head of the person by use of the information on the position of the moving object on the global coordinate. In this case, as is clear from FIG. 3(A), the distance d from the camera to the head of the person can be calculated in the following equation (4).

$$d = (l2 + h2)1/2 \quad (4)$$

The selection evaluation value calculation unit 206 calculates a direction in which the moving object travels from the previous frame to the current frame as illustrated in FIG. 3(B) based on the global coordinate mt of the moving object output from the moving object association unit 205 and the global coordinate mt-1 of the moving object at the previous frame read from the moving object position storage unit 204. The direction is assumed as the front direction of the face of the person as the moving object. The selection evaluation value calculation unit 206 calculates the angle β formed by the moving direction of the moving object and the direction from the moving object toward the camera. The angle β indicates an orientation of the face horizontal to the camera.

The selection evaluation value calculation unit 206 calculates the distance d from the camera to the head of the person, the orientation α of the face tilted to the camera, and the orientation β of the face horizontal to the camera as described above, and then calculates the evaluation values f1, f2 and f3 based on the above values.

Figure 4:
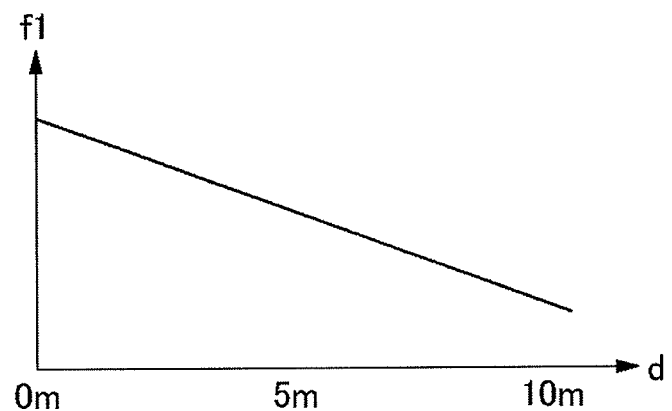
FIG. 4 is a diagram illustrating a relationship between the distance d from the camera to the head of a person and an evaluation value f1 according to the embodiment of the present invention.

FIG. 4 is a diagram illustrating a relationship between the distance d from the camera to the head of the person and the evaluation value f1. The distance d and the evaluation value f1 have a relationship that as the distance d is longer, the evaluation value f1 is smaller. This is because as the distance d is longer, a distortion is larger and a size of the object captured in the all-around image is smaller. The example of FIG. 4 indicates that as the distance d is longer, the evaluation value f1 is linearly smaller, but the relationship is not limited thereto and may be such that as the distance d is longer, the evaluation value f1 n-order-functionally or exponentially smaller.

Figure 5:
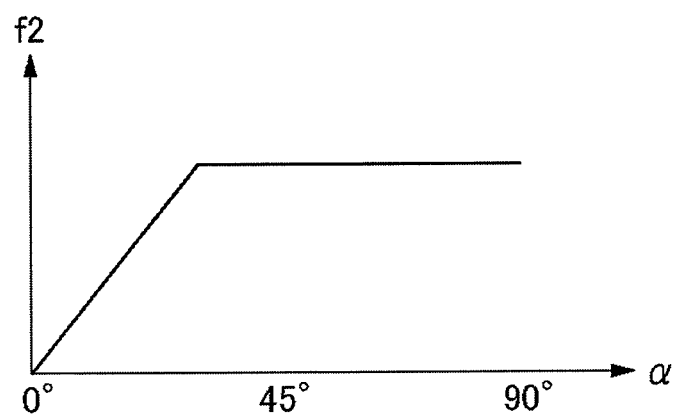
FIG. 5 is a diagram illustrating a relationship between the orientation $\alpha$ of the face tilted to the camera and an evaluation value f2 according to the embodiment of the present invention.

FIG. 5 is a diagram illustrating a relationship between the orientation α of the face tilted to the camera and the evaluation value f2. The angle α and the evaluation value f2 have a relationship that when the angle α is 0 degree, the evaluation value f2 is zero, when the angle is between 0 degree and a certain angle (30 degrees in the example of FIG. 5), as the angle α is larger, the evaluation value f2 is larger, and when the angle is larger than 30 degrees, the evaluation value f2 is constant.

The angle α of 0 degree indicates that the person as a moving object is immediately below the camera (see FIG. 3(A)), and in this state, the face of the person is not captured on an all-around image at all, and only the top of the head of the person is captured. This is because the camera 100 is installed at a higher position than the personas a moving object. Thus, the evaluation value f2 is zero in such a situation. As a horizontal position between the person and the camera is larger, the face of the person is captured on an all-around image and thus the evaluation value f2 is gradually larger.

Since when the orientation α of the face tilted to the camera reaches about 30 degrees, the face of the person is captured in an all-around image to be recognizable, the evaluation value f2 at this time is assumed as an upper limit and the evaluation value f2 takes the upper limit for the angle α of about 30 degrees or more.

Figure 6:
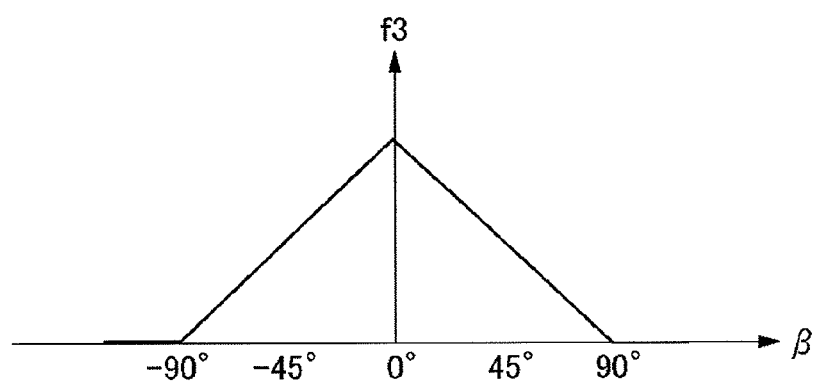
FIG. 6 is a diagram illustrating a relationship between the orientation $\beta$ of the face horizontal to the camera and an evaluation value f3 according to the embodiment of the present invention.

FIG. 6 is a diagram illustrating a relationship between the orientation β of the face horizontal to the camera and the evaluation value f3. When the angle β is −90 degrees or less or 90 degrees or more, the evaluation value f3 is zero, the evaluation value f3 increases as the angle approaches 0 degree from −90 degrees, and the evaluation value f3 reaches a peak at 0 degree and decreases from 0 degree toward 90 degrees.

The angle β of 0 degree indicates that the face of the person faces front in the horizontally direction to the camera, which increases the evaluation value f3. The angle β of −90 degrees and 90 degrees indicates that the face of the person is captured in profile in an all-around image, and the angle β of −90 degrees or less and 90 degrees or more indicates that the head of the person is captured from obliquely behind or from behind. Thus, when the angle β is −90 degrees or less and 90 degrees or more, the evaluation value f3 takes zero. In the example of FIG. 6, f3 linearly increases or decreases between −90 degrees and 90 degrees, but it is not limited thereto and may n-order-functionally or exponentially increase and decrease.

The selection evaluation value y is calculated by a product of f1, f2 and f3. The respective maximum values of f1, f2 and f3 may be 1. At this time, the maximum value of the selection evaluation value y is also 1. The respective maximum values of f1, f2, f3 may different values. A larger maximum value is given to an evaluation value than other evaluation values so that the evaluation value can be emphasized (weighted) than other evaluation values.

The image delivery camera selection unit 207 calculates the selection evaluation values y of the respective cameras for the same moving object, and selects the cameras having the largest selection evaluation value y as image delivery cameras. When a plurality of moving objects are captured in an all-around image, the image delivery camera selection unit 207 selects the image delivery cameras per moving object specified in the moving object association unit 205.

When selecting the image delivery cameras, the image delivery camera selection unit 207 outputs the selection result to the image delivery camera notification unit 208. The image delivery camera 207 transmits information for specifying the selected image delivery cameras to the cameras 100 connected to the server 200. The image delivery camera notification unit 208 may notify a request for a cutout image only to the selected cameras 100.

When the cutout image is sent from the camera 100 in response to the notification of the image delivery camera notification unit 208, the image input unit 209 in the server 200 receives the same. The distortion correction unit 210 corrects a distortion of the cutout image thereby to generate a plan image. The distortion-corrected plan image looks like being captured by a typical lens. The image recognition unit 211 makes an image recognition by use of the plan image, and recognizes and analyzes the face of the person captured on the plan image thereby to authenticate the person. The image recognition unit 211 may determine whether the person captured on the cutout image is a registered person by collating the faces of the persons registered in a database (not shown) and the recognized face.

The recognition result output unit 212 outputs the image recognition result by the image recognition unit 211. The recognition result output unit 212 may be connected to an alarm device. In this case, the alarm device may operate when the recognition result output unit 212 outputs the recognition result that the recognized face of the person is not registered in the database. The server 200 may further comprise a monitor. In this case, the plan image generated by the distortion correction unit 210 or the image recognition result may be displayed on the monitor.

Examples in which images are actually captured by use of the image capturing system 1 will be described below.

First Example

Figure 7:
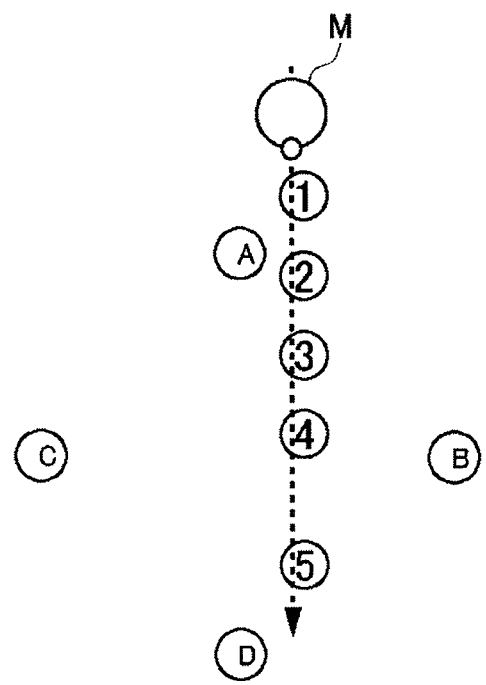
FIG. 7 is a diagram illustrating an arrangement of cameras and motions of a person according to a first example of the embodiment of the present invention.

FIG. 7 is a diagram illustrating an arrangement of cameras and motions of a person according to a first example. There will be described selection of image delivery cameras when the person M moves as in FIG. 7 relative to four cameras A to D arranged as in FIG. 7 with reference to FIG. 8 and FIG. 9. Numerals 1 to 5 in FIGS. 7 to 9 indicate positions at respective times when the person M moves. The cameras A to D are arranged at the corners of a square.

Figure 8:
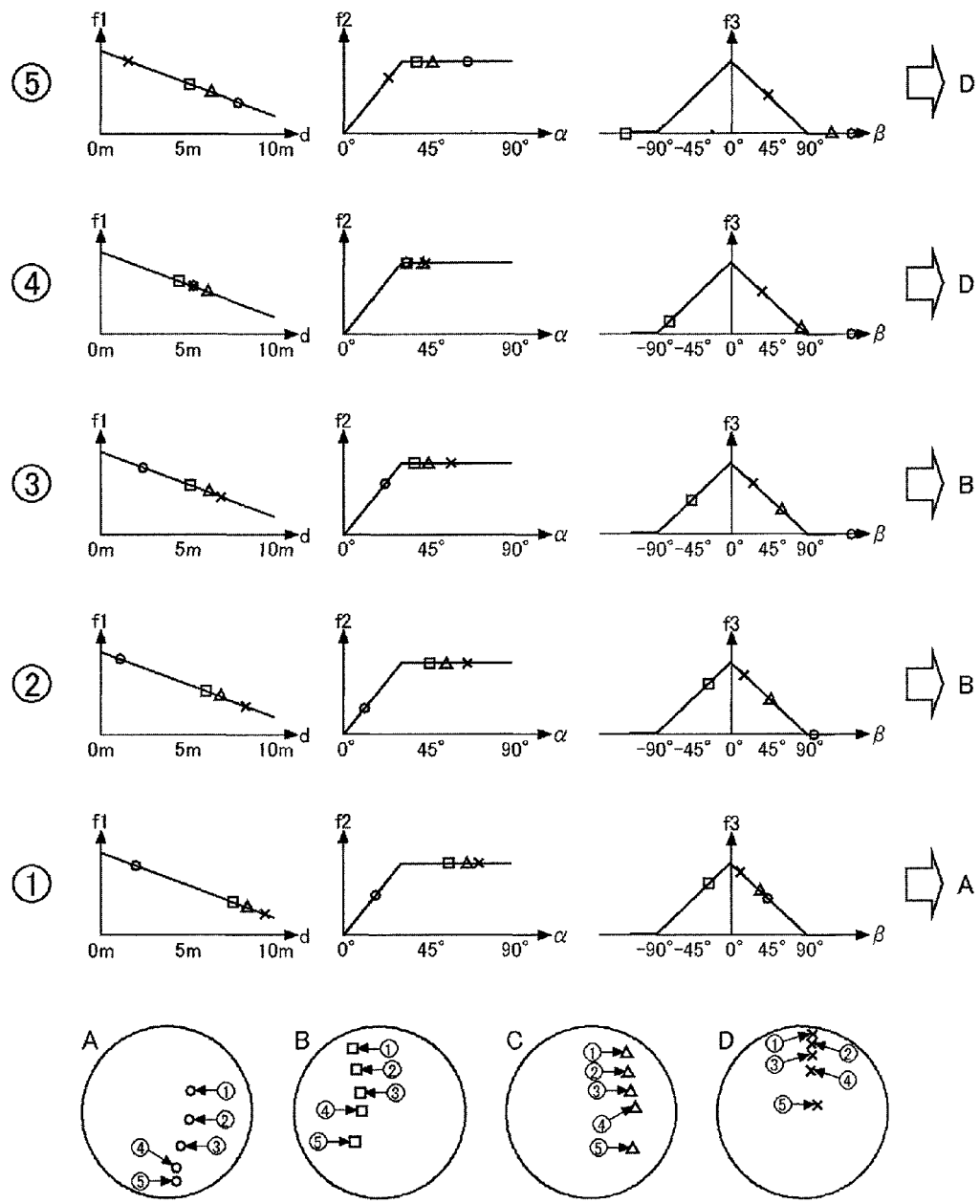
FIG. 8 is a diagram illustrating the positions of a person M in all-around images of cameras A to D, and the evaluation values f1 to f3 of the cameras A to D at respective times 1 to 5 according to the first example of the embodiment of the present invention.

FIG. 8 is a diagram illustrating the positions (the lowermost stage) of the person M in the all-around images of the cameras A to D according to the first example, and the evaluation values f1 to f3 (first to fifth stages) of the cameras A to D at respective times 1 to 5. At time 1, the evaluation value y (=f1×f2×f3) of the camera A is the largest, and thus the camera A is selected as an image delivery camera. Similarly, at times 2 to 5, the camera B, the camera B, the camera D and the camera D are selected as the image delivery cameras, respectively.

Figure 9:
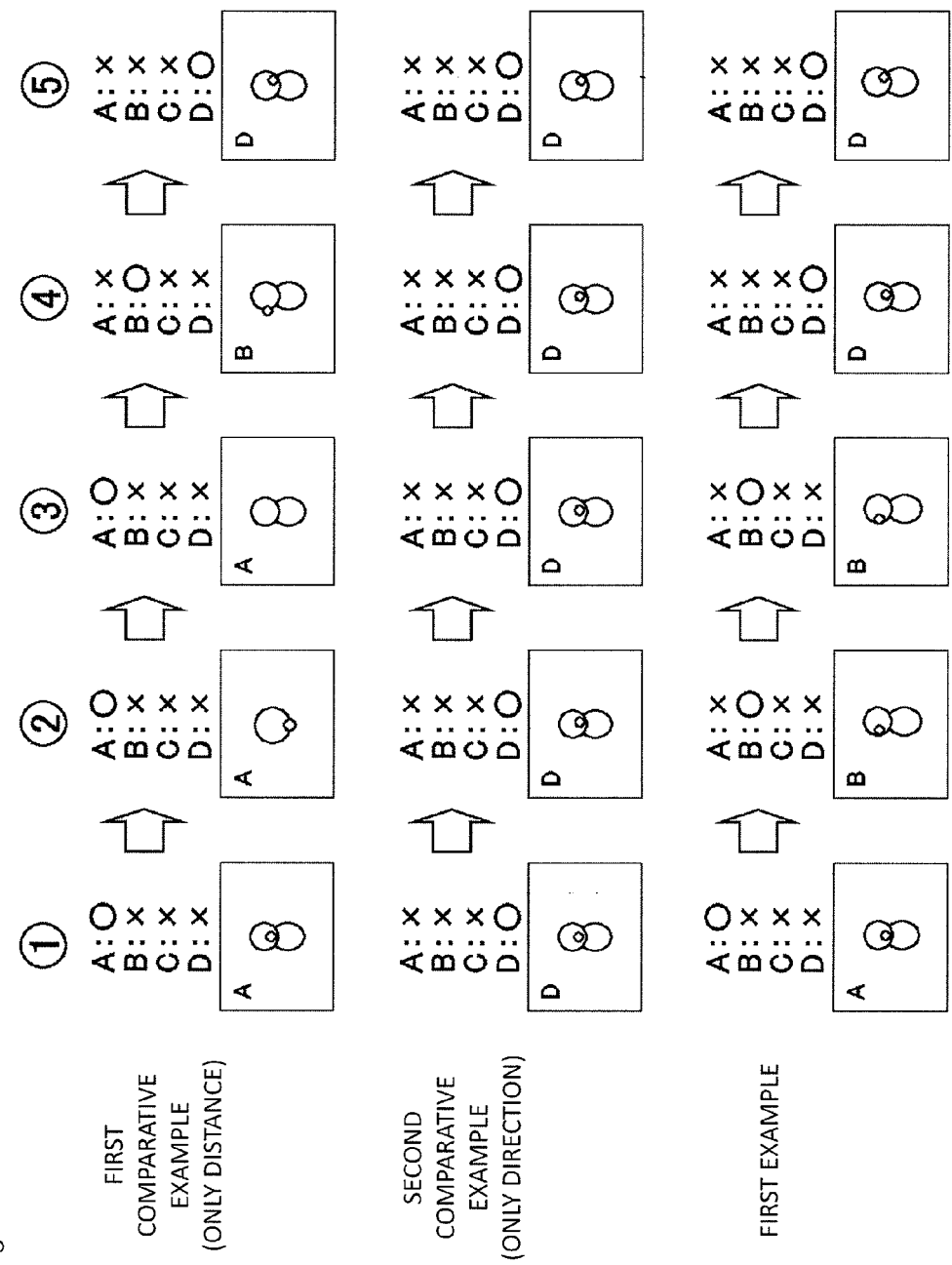
FIG. 9 is a diagram for explaining the first example of the embodiment of the present invention in comparison with comparative examples.

FIG. 9 is a diagram for explaining the first example in comparison with comparative examples. In FIG. 9, the case in which the image delivery cameras are selected based on only the distance d from the camera to the head of the person (first comparative example) and the case in which the image delivery cameras are selected based on only the orientation f3 of the face horizontal to the camera (second comparative example) in the example of FIG. 7 are compared with the first example described in FIG. 8.

With reference to the f1-*d* graphs on the leftmost parts on the first to fifth stages in FIG. 8, the camera A, the camera A, the camera A, the camera B and the camera D have the largest evaluation value f1 based on the distance d from the camera to the head of the person at times 1 to 5, respectively. As is clear from FIG. 9, the top of the head of the person M is captured and the face is not captured at time 2 in the first comparative example, and thus the person cannot be authenticated. The back of the person M is captured and the face is not captured at time 3, and thus the person cannot be authenticated.

With reference to the f3-β graphs on the rightmost parts on the first to fifth stages in FIG. 8, the camera D has the largest evaluation value f3 based on the orientation β of the face horizontal to the camera at times 1 to 5. However, the distance is long and thus the face of the person captured in the all-around image is so small at time 1 or time 2, and thus even if the image is enlarged, it is so coarse and the person cannot be authenticated.

To the contrary, according to the first example, a camera capable of providing an optimum image for authenticating a person based on the face image can be selected at each time. Thereby, the person can be authenticated at each time.

Second Example

Figure 10:
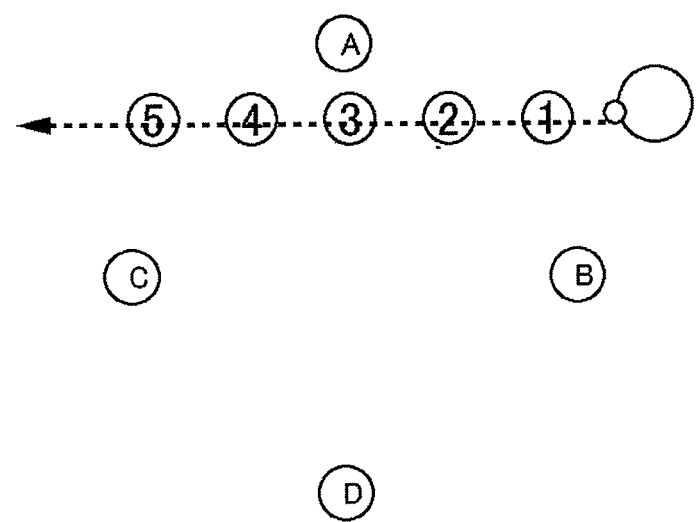
FIG. 10 is a diagram illustrating an arrangement of cameras and motions of a person according to a second example of the embodiment of the present invention.

FIG. 10 is a diagram illustrating an arrangement of cameras and motions of a person according to a second example. There will be described selection of image delivery cameras when the person M moves as in FIG. 10 relative to four cameras A to D arranged as in FIG. 10 with reference to FIG. 11. Numerals 1 to 5 in FIG. 10 and FIG. 11 indicate positions at respective times when the person M moves. The cameras A to D are arranged at the corners of a square.

Figure 11:
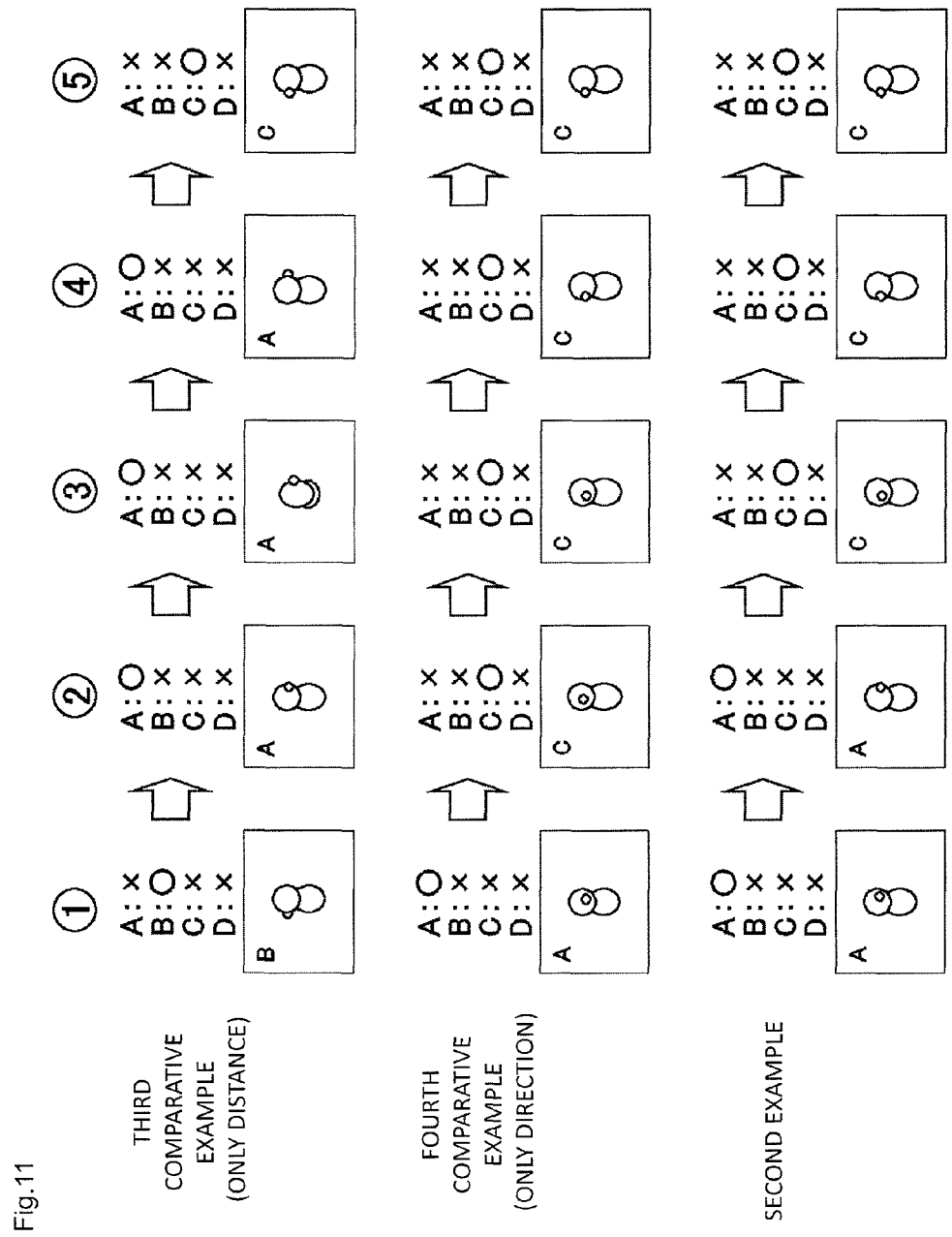
FIG. 11 is a diagram for explaining the second example of the embodiment of the present invention in comparison with comparative examples.

With reference to the upper stage of FIG. 11, the camera B, the camera A, the camera A, the camera B and the camera C have the largest evaluation value f1 based on the distance d from the camera to the head of the person at times 1 to 5, respectively, and the cameras are selected as the image delivery cameras at the times, respectively.

As is clear from FIG. 11, the camera B and the camera A are selected at time 1 and time 4, respectively, in the third comparative example, and the person M is captured from obliquely behind and the face is almost not captured in the all-around images, and thus the person cannot be authenticated. The top of the head of the person M is captured and the face is not captured at time 2, and thus the person cannot be authenticated.

With reference to the middle stage of FIG. 11, the camera A, the camera C, the camera C, the camera C and the camera C have the largest evaluation value f3 based on the orientation β of the face horizontal to the camera at times 1 to 5, respectively, and the cameras are selected as the image delivery cameras at the times, respectively. Since the camera C is selected at time 2 but the distance from the camera C to the person M is long, the person captured in the all-around image is so small, and even if the image is enlarged, it is so coarse and the person cannot be authenticated.

To the contrary, according to the first example, a camera capable of providing an optimum image for authenticating a person based on the face image can be selected at each time. Thereby, the person can be authenticated at each time.

Figure 12:
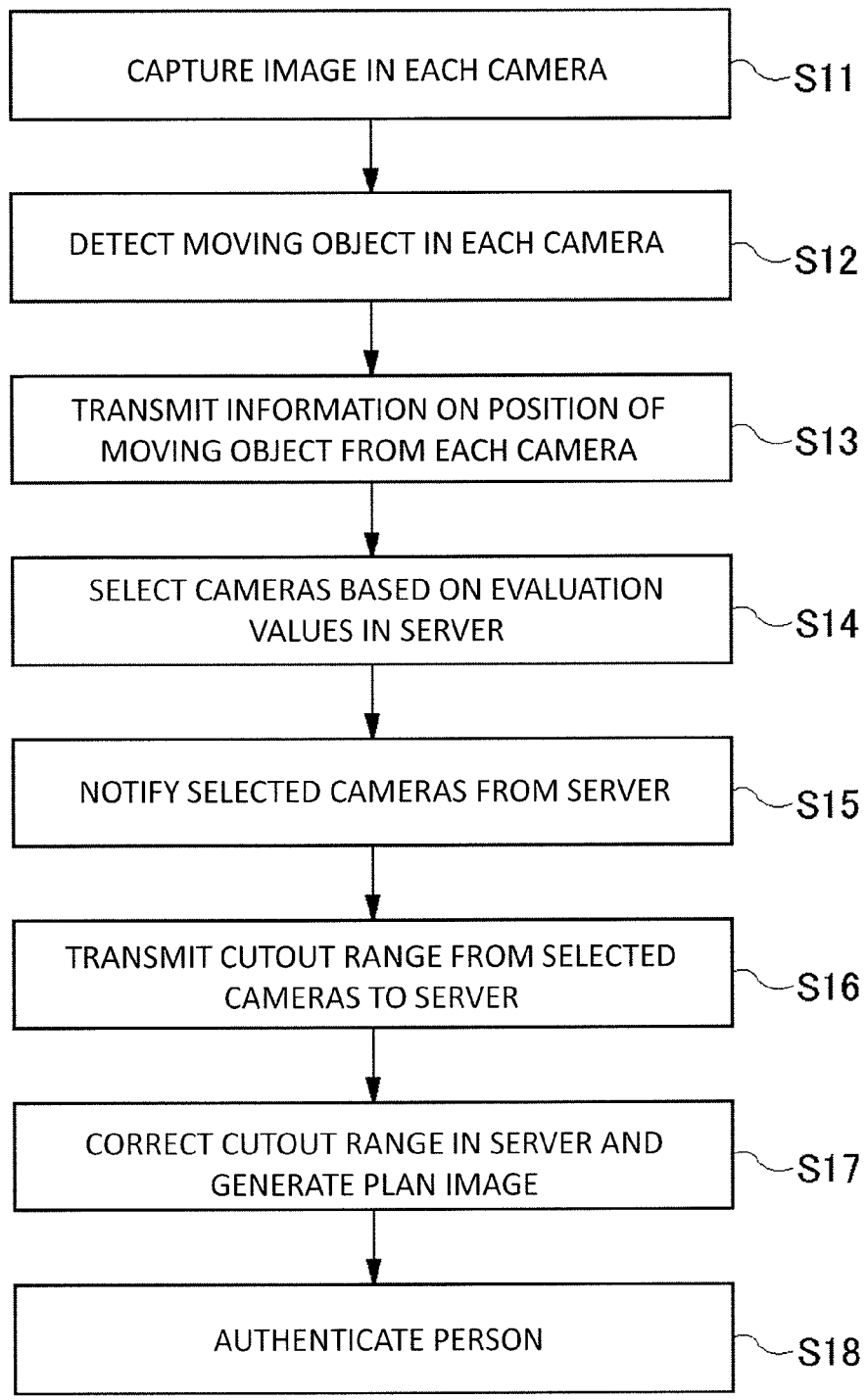
FIG. 12 is a flowchart of an image capturing method according to the embodiment of the present invention.

An image capturing method according to the embodiment of the present invention will be described below. FIG. 12 is a flowchart of the image capturing method according to the embodiment of the present invention. The image capturing method is performed in the image capturing system 1. At first, each of the cameras 100 connected to the server 200 captures an image in the all-around image acquisition unit 101 and generates an all-around image (step S11). Each camera detects a moving object from the generated all-around image in the moving object detection unit 102 (step S12). The moving object detection unit 102 transmits information on the position of the detected moving object in the all-around image to the server 200 (step S13).

In the server 200, when the moving object position input unit 201 acquires the information on the position n of the moving object transmitted from each camera 100, the selection evaluation value calculation unit 206 calculates the evaluation value y of each camera, and selects image deliver cameras based on the evaluation value y (step S14). The image delivery camera notification unit 208 notifies the selected image delivery cameras to the cameras 100 (step S15).

The cameras 100 selected as the image delivery cameras each generate a cutout image in the cutout image generation unit 105, and transmit the cutout image from the image transmission unit 104 to the server 200 (step S16).

In the server 200, when the image input unit 209 receives the cutout image, the distortion correction unit 210 corrects a distortion and generates a plan image (step S17). Then, the image recognition unit 211 authenticates a person captured on the plan image by use of the plan image, and the recognition result output unit 212 outputs the recognition result (step S18). The plan image and the recognition result are displayed on the monitor after step S17 and after step S18 as needed, respectively.

As described above, with the image capturing system 1 according to the present embodiment, when a plurality of cameras 100 are connected to the server 200, the server 200 selects the image delivery cameras by the selection evaluation value y calculated based on the evaluation value f1 of the distance d from the camera to the head of the person, the evaluation value f2 of the orientation (angle) α of the face tilted to the camera, and the evaluation value f3 of the orientation (angle) β of the face horizontal to the camera, thereby acquiring a cutout image from the camera capturing an optimum image for authenticating the person.

Each camera 100 does not always transmit the all-around image to the server 200, does not always transmit the cutout image having the less amount of data than the all-around image to the server 200, and transmits the images only when it is selected as the image delivery camera. Each camera 100 always transmits only the information on the position of the moving object on the all-around image to the server when detecting the moving object, and the information on the position has a much less amount of data than the image information. Thus, with the image capturing system 1 according to the present embodiment, communication traffics between the cameras and the server can be largely reduced in the server connected to the cameras in the image capturing system employing only the images captured by some cameras.

There has been described above, according to the embodiment, the example in which the evaluation value f1 for the distance d, the evaluation value f2 for the angle α, and the evaluation value f3 for the angle β are calculated, respectively, for describing how the image delivery camera selection unit 207 selects the image delivery cameras in consideration of the distance d from the camera to the head of the person, the orientation (angle) α of the face tilted to the camera and the orientation (angle) β of the face horizontal to the camera, but, as is clear from the equation (2) and FIG. 3(A), the distance d and the angle α (0 degree to 90 degrees) have an one-to-one correspondence. That is, if either the distance d or the angle α is determined, the other is determined, and if either the evaluation value f1 or the evaluation value f2 is determined, the other determined.

Thus, for actually calculating the selection evaluation value y, the selection evaluation value y may be calculated by use of an evaluation value f12 reflecting the distance d and the angle α at the same time. The evaluation value f12 may be calculated with either the distance d or the angle α as a variable. Alternatively, the distance d and the angle α can be uniquely calculated by the distance r from the center of the moving object on the all-around image, and thus the evaluation value f12 may use the distance r as a variable. That is, the evaluation value f12 may be assumed as an evaluation value for the position relationship between the camera and the moving object. Assuming the angle α as a variable, the selection evaluation value y can be calculated in the following equation (5).

$$y = f12(\alpha) \times f3(\beta) \quad (5)$$

Figure 13:
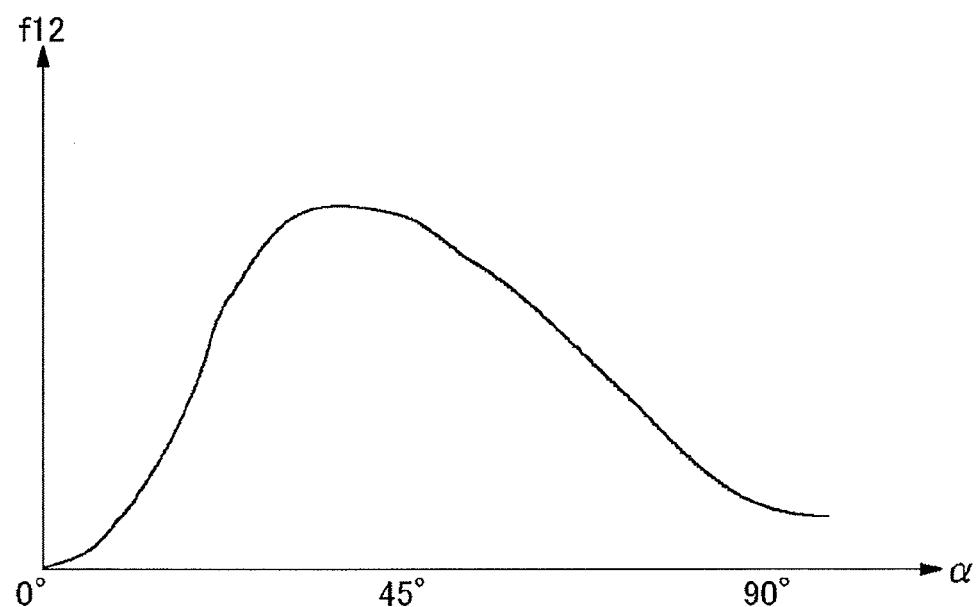
FIG. 13 is a diagram illustrating a relationship between the orientation $\alpha$ of the face tilted to the camera and an evaluation value f12 according to the embodiment of the present invention.

FIG. 13 is a diagram illustrating a relationship between the orientation α of the face tilted to the camera and the evaluation value f12. As illustrated in FIG. 13, at α=0 (that is, when the moving object is immediately below the camera), the evaluation value f12 is 0, and as the angle α increases, the evaluation value f12 also increases. When the angle α reaches about 30 degrees, the evaluation value f12 reaches a peak, and when the angle α increases beyond 30 degrees, the evaluation value f12 gradually decreases. This is because when the angle α increases beyond 30 degrees, the angle of the face tilted to the camera increases and the face can be easily viewed, but the distance is longer and the image quality is deteriorated so that the face is difficult to recognize.

According to the embodiment, the server 200 acquires the cutout image to perform the person authentication, and selects the optimum cameras for the person authentication (authentication based on the face image) as the image delivery cameras for the selection of the image delivery cameras in the image delivery camera selection unit 207. Then, the evaluation values (f2, f3) among the evaluation values are increased for the front direction of the face close to the direction from the person to the camera, thereby selecting the image delivery cameras.

However, even if the optimum cameras for the person authentication are selected, only the image of a profile may be obtained depending on the position of the person at time 5 according to the second example, for example. In this case, if a database for the images of the profiles in addition to the images of the front faces is present, the image recognition unit 211 uses the database of the images of the profiles thereby to authenticate the person captured on the plan image.

Thus, the image delivery camera may output the information on the orientation of the face in the horizontal direction (that is, the angle β) having the evaluation value used for selecting the image delivery camera to the image recognition unit 211. The image recognition unit 211 can perform the person authentication based on the orientation β of the face in the horizontal direction acquired from the image delivery camera selection unit 207 with reference to not the database of the images of the front faces but the database of the images of the profiles.

According to the embodiment, the evaluation value f3 is calculated with the moving direction of the person as the orientation of the face in the horizontal direction assuming that the face of the person faces front in the moving direction, but actually the person may move while facing sideways, and the moving direction does not necessarily match with the orientation of the face in the horizontal direction. Not only the orientation of the face in the horizontal direction estimated based on the moving direction of the person but also the orientation of the face in the horizontal direction recognized by the image recognition may be considered. A variant therefor will be described below.

(Variant)

A face orientation recognition unit is added to the camera 100 in the variant. The face orientation recognition unit acquires an all-around image from the all-around image generation unit 101 and acquires information on the position of a moving object from the moving object detection unit 102. The face orientation recognition unit makes a face recognition around the position of the moving object on the all-around image based on the information on the position of the moving object, and recognizes an orientation of the face in the horizontal direction. The face orientation recognition unit recognizes an orientation of the face by pattern matching, for example. At this time, the face orientation recognition unit may recognize an orientation of the face by use of an average value of multiple past frames.

An orientation $\gamma$ of the face in the horizontal direction recognized by the face orientation recognition unit is transmitted from the camera 100 to the server 200, and the selection evaluation value calculation unit 206 in the server 200 acquires the same. The selection evaluation value calculation unit 206 calculates the selection evaluation value by use of an evaluation value f4 based on the orientation $\gamma$ of the face in the horizontal direction calculated by the image recognition in addition to the evaluation values f1 to f3 according to the embodiment. Specifically, the selection evaluation value y is calculated in the following equation (6).

$$y = f1(d) \times f2(\alpha) \times f3(\beta) \times f4(\gamma) \quad (6)$$

The selection evaluation value calculation unit 206 calculates the distance d from the camera to the head of the person, the orientation $\alpha$ of the face tilted to the camera, and the orientation $\beta$ of the face horizontal to the camera similarly to the embodiment, and then calculates the evaluation values f1, f2 and f3 based on the above values, respectively. The selection evaluation value calculation unit 206 further calculates the evaluation value f4 based on the orientation $\gamma$ of the face horizontal to the camera acquired from the camera 100.

Figure 14:
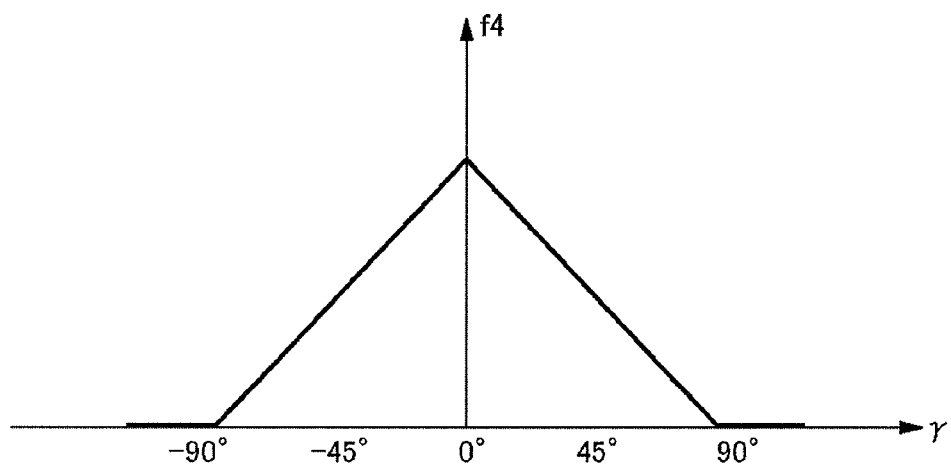
FIG. 14 is a diagram illustrating a relationship between an orientation γ of the face horizontal to the camera and an evaluation value f4 according to the embodiment of the present invention.

FIG. 14 is a diagram illustrating a relationship between the orientation $\gamma$ of the face horizontal to the camera and the evaluation value f4. The evaluation value f4 is zero when the angle $\gamma$ is −90 degrees or less or 90 degrees or more, the evaluation value f4 increases from −90 degrees toward 0 degree, and the evaluation value f4 reaches a peak at 0 degree and decreases from 0 degree toward 90 degrees. That is, the evaluation value f4 is the same function as the evaluation value f3.

The angle $\gamma$ of 0 degree indicates that the face of the person faces front in the horizontal direction to the camera, and thus the evaluation value f4 is increased. The angle $\gamma$ of −90 degrees and 90 degrees indicates that the face of the person is captured in profile in an all-around image, and the angle $\gamma$ of −90 degrees or less and 90 degrees or more indicates that the head of the person is captured from obliquely behind or from behind. When the angle $\gamma$ is −90 degrees or less and 90 degrees or more, the evaluation value f4 is zero. In the example of FIG. 14, f4 linearly increases and decreases from −90 degrees to 90 degrees, but is not limited thereto and may n-order-functionally or exponentially increase and decrease.

The selection evaluation value y is calculated by a product of f1, f2, f3 and f4. The respective maximum values of f1, f2, f3 and f4 may be 1. At this time, the maximum value of the selection evaluation value y is also 1. The respective maximum values of f1, f2, f3 and f4 may be different values. A larger maximum value is given to an evaluation value than other evaluation values so that the evaluation value can be emphasized (weighted) than other evaluation values.

Figure 15:
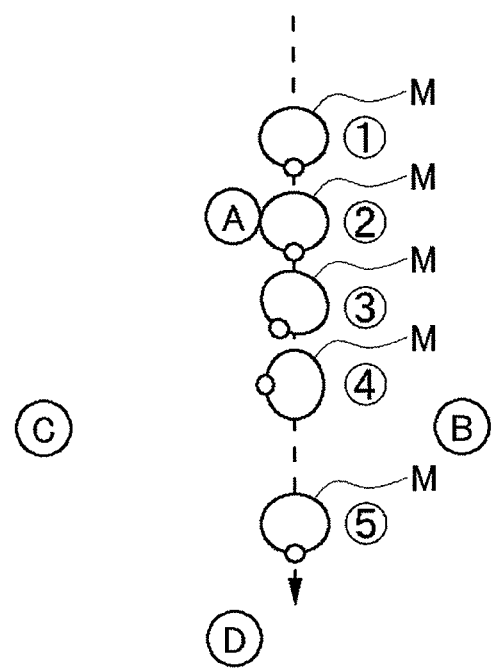
FIG. 15 is a diagram illustrating an arrangement of cameras, motions of a person, and an orientation of the face in the horizontal direction according to a variant of the embodiment of the present invention.
Figure 16:
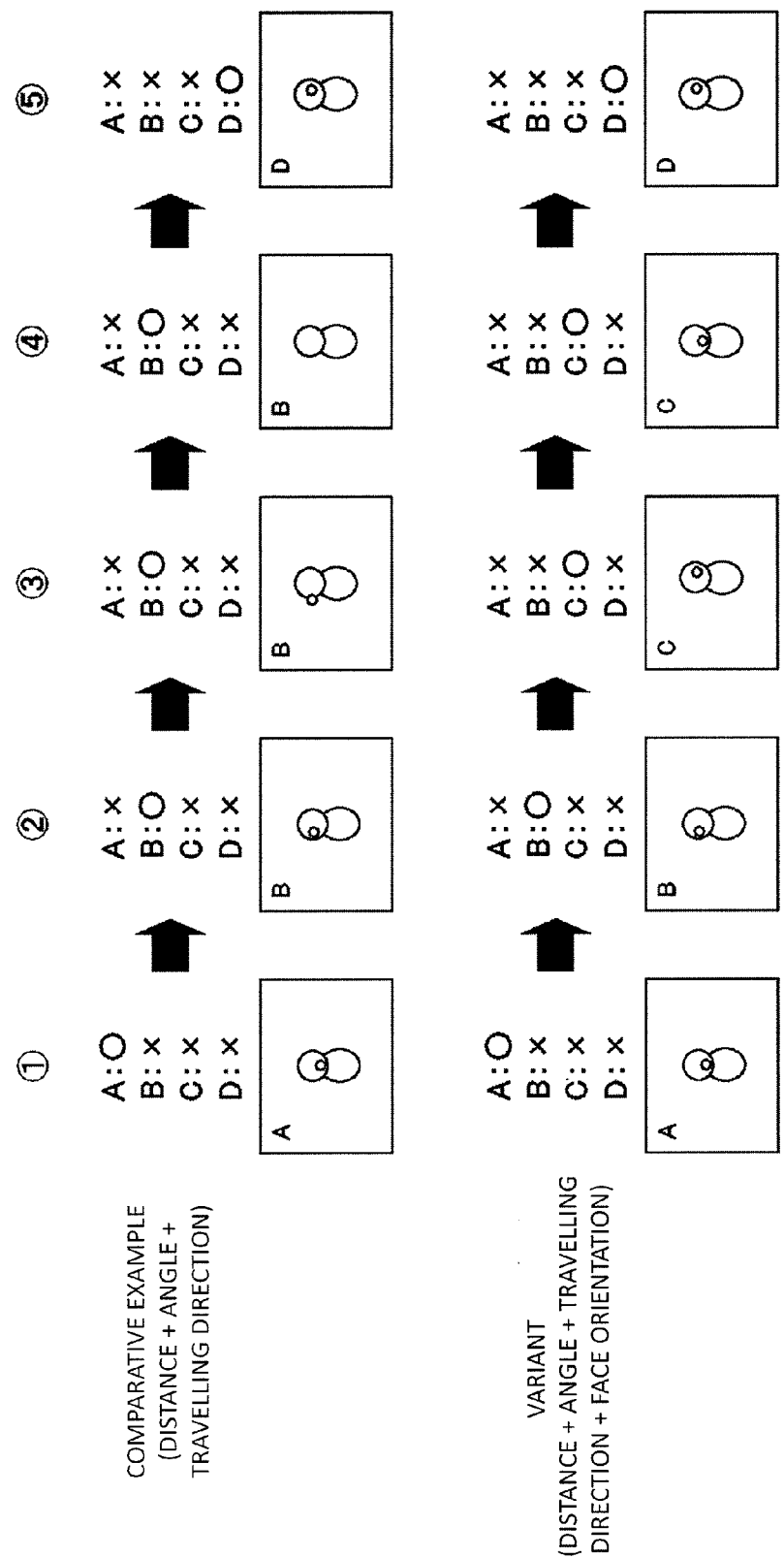
FIG. 16 is a diagram for explaining the variant of the embodiment of the present invention in comparison with a comparative example.

FIG. 15 is a diagram illustrating an arrangement of cameras, motions of a person and orientations of the face in the horizontal direction according to the variant. FIG. 16 is a diagram for explaining the variant of the embodiment of the present invention in comparison with a comparative example. There will be described selection of image delivery cameras when the person M moves as in FIG. 15 relative to four cameras A to D arranged as in FIG. 15 with reference to FIG. 15 and FIG. 16. Numerals 1 to 5 in FIG. 15 and FIG. 16 indicate the positions at respective times when the person M moves. The cameras A to D are arranged at the corner of a square. In FIG. 16, the embodiment is illustrated as the comparative example of the variant.

In the comparative example, the evaluation value y (=f1×f2×f3) of the camera A is the largest at time 1, and thus the camera A is selected as an image delivery camera. Similarly, the camera B, the camera B, the camera B and the camera D are selected as the image delivery cameras at times 2 to 5, respectively. On the other hand, according to the present variant, the evaluation value y (=f1×f2×f3×f4) of the camera A is the largest at time 1, and thus the camera A is selected as an image delivery camera. Similarly, the camera B, the camera C, the camera C and the camera D are selected as the image delivery cameras at times 2 to 5, respectively.

As is clear from FIG. 16, the face of the person M is captured in profile and the orientation of the face is not front at time 3 and thus the person is difficult to authenticate in the first comparative example. The back of the person M is captured and the face is not captured at time 4, and thus the person cannot be authenticated. Such a situation occurs because the orientation of the face of the person in the horizontal direction is different from the moving direction as illustrated in FIG. 15.

To the contrary, according to the variant, since the orientation $\gamma$ of the face in the horizontal direction is so low for the camera B at time 3, the evaluation value f4 of the camera B is smaller and the selection evaluation value y is smaller, and thus the camera B is not selected. Instead, the evaluation value f4 of the camera C for which the face faces front is larger, and consequently the camera C is selected.

Since the back of the person M is captured and the orientation $\gamma$ of the face in the horizontal direction is zero for the camera B at time 4, the evaluation value f4 of the camera B is smaller and the selection evaluation value y is smaller, and thus the camera B is not selected. Instead, the evaluation value f4 of the camera C for which the face faces front is larger, and consequently the camera C is selected.

In this way, according to the variant, there can be selected a camera capable of providing an optimum image for authenticating the person based on the face image at each time even when the orientation of the face of the person in the horizontal direction is different from the travelling direction. Thereby, the person authentication can be performed at each time.

The face orientation recognition unit in the camera 100 calculates the angle $\gamma$ of the orientation of the face in the horizontal direction and provides it to the selection evaluation value calculation unit 206 in the server 200 and the selection evaluation value calculation unit 206 calculates the evaluation value f4 using a variable of $\gamma$ according to the variant, but the face orientation recognition unit in the camera 100 may calculate the evaluation value f4 and provide it to the selection evaluation value calculation unit 206 in the server 200. In this case, the face orientation recognition unit may take f4=1 when both eyes are detected from the face (the face faces front), take f4=0.5 when only either eye is detected from the face (the face faces sideways), and take f4=0 when no eye is detected from the face (the face faces rearward).

In the variant described above, the selection evaluation value y may be calculated without using the orientation $\beta$ of the face in the horizontal direction estimated from the moving direction of the person. In this case, the selection evaluation value y is calculated in the following equation (7).

$$y = f1(d) \times f2(\alpha) \times f4(\gamma) \quad (7)$$

The cameras which capture the all-around images having much image information on the face of the person are selected as the image delivery cameras in order to perform the person authentication based on the face images according to the embodiment and the variant, but the present invention is not limited to the embodiment. The image capturing system according to the present invention may select the cameras which capture the all-around images on which a person faces in a specifically-set direction as the image delivery cameras. For example, when a criminal investigation is made by use of the image capturing system applied as a monitor system, when characters on the back of a person are to be confirmed, the selection evaluation value of the camera which captures the image on which the person faces rearward may be increased.

The selection evaluation value is set such that a camera which captures an image suitable for the image recognition processing is selected as an image delivery camera according to the embodiment and the variant, but when the display of a cutout image in the server is emphasized or when the image recognition is not performed and only the display is performed in the server, the selection evaluation value may be set such that a camera which captures an image optimum for the display is selected as an image delivery camera.

Only one image delivery camera is selected from among the cameras 100 according to the embodiment and the variant, but two or more cameras may be selected as the image delivery cameras. In this case, a predetermined number of cameras may be selected from among the cameras in descending order of the selection evaluation value, or the cameras may be selected per selection evaluation value by use of a plurality of selection evaluation values.

The camera 100 detects a moving object and transmits information on the position of the detected moving object on an all-around image to the server 200 according to the embodiment and the variant, but is not limited to the form. There may be configured such that the global coordinate conversion unit 202 and the camera position storage unit 203 are provided on the camera 100 side, a moving object is detected in the camera 100, the position of the detected moving object on a global coordinate is calculated and the information on the position is transmitted to the server 200.

The camera 100 selected as an image delivery camera generates a cutout image from an all-around image and transmits the cutout image to the server 200 according to the embodiment and the variant, but the selected camera 100 may transmit the all-around image to the serve 200 and the server 200 may generate the cutout image.

According to the embodiment and the variant, the moving object is not necessarily limited to a moving one without stopping, and a part in which a difference from the past all-around image occurs may be assumed as a part in which the moving object is captured. For example, also when an object not present in the past all-around images is captured in the current all-around image (the object itself is still), the still object may be detected as a moving object.

The moving object detection unit 102 detects a moving object from an all-around image and the selection evaluation value calculation unit 206 calculates the selection evaluation value y by use of the position relationship evaluation values (f1 and f2 or f12) for the position relationship between the camera and the moving object according to the embodiment and the variant, but only the evaluation values (f3 and/or f4) of the orientation of the face horizontal to the camera (in the pan direction) may be used for calculating the selection evaluation value y without using the position relationship evaluation values (f1 and f2 and f12) for the position relationship between the camera and the moving object.

The preferred embodiment according to the present invention, which is currently possible, has been described above, but the present embodiment may be variously modified, and all the variations within the spirit and scope of the present invention intends to be encompassed in claims.

INDUSTRIAL APPLICABILITY

As described above, the present invention is useful as an image capturing system or the like which can reduce the amount of data for communication between a plurality of cameras and a camera control device and captures images by use of the cameras.

REFERENCE NUMERALS LIST 1 image capturing system
100 camera
101 all-around image generation unit
102 moving object detection unit
103 cutout image generation unit
104 image transmission unit
200 server (camera control device)
201 moving object position input unit
202 global coordinate conversion unit
203 camera position storage unit
204 moving object position storage unit
205 moving object association unit
206 selection evaluation value calculation unit
207 image delivery camera selection unit
208 image delivery camera notification unit
209 image input unit
210 distortion correction unit
211 image recognition unit
212 recognition result output unit

The invention claimed is:

1. An image capturing system including a camera control device and a plurality of cameras connected to the camera control device, wherein
each of the plurality of cameras comprises:
an image generator that generates an all-around image by capturing the all-around image;
a moving object detector that detects a moving object from the all-around image generated by the image generator and transmits information indicating a position of the moving object in the all-around image to the camera control device; and
a transmitter that transmits a clipped image including the moving object, based on the all-around image, when the camera is selected by the camera control device, and
the camera control device comprises:
an information receiver that receives the information indicating the position of the moving object in the all-around image from a camera of the plurality of cameras, the information indicating the position of the moving object at least relating to a tilt of the moving object relative to the camera;
a generator that transforms the information indicating the position of the moving object, relating to the tilt, into an evaluation value of the tilt of the moving object relative to the camera, based on a relationship between the position of the moving object and a center of the all-around image;
a selector that selects at least one camera from the plurality of cameras based on the evaluation value of the tilt;

a notifier that notifies a selection result by the selector, to the plurality of cameras; and an image receiver that receives the clipped image from each of the selected at least one camera.

2. The image capturing system according to claim 1, wherein the generator further transforms the position of the moving object into an evaluation value of a distance between the moving object and the camera, based on the relationship between the position of the moving object and the center of the all-around image; and the selector selects the at least one camera based on the evaluation value of the tilt and the evaluation value of the distance.

3. The image capturing system according to claim 1, wherein the transmitter extracts a part containing the moving object from the all-around image, and transmits the extracted part as the clipped image.

4. The image capturing system according to claim 1 wherein the camera control device further comprises an image recognizer that performs recognition processing on the moving object in the received clipped image, and the selector selects the at least one camera suitable for the recognition processing.

5. The image capturing system according to claim 1, wherein the generator further obtains an evaluation value of a horizontal angle of the moving object, based on a relationship between a history of the position of the moving object and the center of the all-around image, and the selector selects the at least one camera based on the evaluation value of the tilt and the evaluation value of the horizontal angle.

6. The image capturing system according to claim 1, wherein each of the plurality of cameras further comprises a generator that generates an evaluation value of a horizontal angle of the moving object, by performing recognition processing on the all-around image, and transmits the evaluation value of the horizontal angle to the camera control device, and the selector in the camera control device selects the at least one camera based on the evaluation value of the tilt and the evaluation value of the horizontal angle.

7. A camera control device which is connected to and controls a plurality of cameras, each of the plurality of cameras capturing an all-around image, the camera control device comprising:

an information receiver that receives information indicating a position of a moving object in the all-around image from a camera of the plurality of cameras, the information indicating the position of the moving object at least relating to a tilt of the moving object relative to the camera;

a generator that transforms the information indicating the position of the moving object, relating to the tilt, into an evaluation value of the tilt of the moving object relative to the camera, based on a relationship between the position of the moving object and a center of the all-around image;

a selector that selects at least one camera from the plurality of cameras based on the evaluation value of the tilt;

a notifier that notifies a selection result by the selector to the plurality of cameras; and an image receiver that receives a clipped image including the moving object from each of the selected at least one camera, the clipped image being generated based on the all-around image.

8. An image capturing method in an image capturing system including a camera control device and a plurality of cameras connected to the camera control device, the method comprising:

generating an all-around image by capturing the all-around image in each of the plurality of cameras;

detecting a moving object from the generated all-around image in each of the plurality of cameras;

transmitting information indicating a position of the moving object in the all-around image to the camera control device from each of the plurality of cameras;

receiving, from a camera of the plurality of cameras, the information indicating the position of the moving object in the all-around image in the camera control device, the information indicating the position of the moving object at least relating to a tilt of the moving object relative to the camera;

transforming, in the camera control device, the information indicating the position of the moving object, relating to the tilt, into an evaluation value of the tilt of the moving object relative to the camera, based on a relationship between the position of the moving object and a center of the all-around image;

selecting at least one camera from the plurality of cameras based on the evaluation value of the tilt, in the camera control device;

notifying a selection result to the plurality of cameras by the camera control device;

transmitting a clipped image containing the moving object, based on the all-around image, from each of the selected at least one camera to the camera control device; and receiving, by the camera control device, the clipped image transmitted from each of the selected at least one camera to the camera control device.

9. A camera control method in a camera control device which is connected to and controls a plurality of cameras, each of the plurality of cameras capturing an all-around image, comprising:

receiving, from a camera of the plurality of cameras, information indicating a position of a moving object in the all-around image, the information indicating the position of the moving object at least relating to a tilt of the moving object relative to the camera;

transforming the information indicating the position of the moving object, relating to the tilt, into an evaluation value of the tilt of the moving object relative to the camera, based on a relationship between the position of the moving object and a center of the all-around image;

selecting at least one camera from the plurality of cameras based on the evaluation value of the tilt;

notifying a selection result to the plurality of cameras; and receiving a clipped image including the moving object from each of the selected at least one camera, the clipped image being generated based on the all-around image.

10. A non-transitory computer readable recording medium storing a computer program that causes a computer to perform the camera control method according to claim 9.

11. The image capturing system according to claim 2, wherein the transmitter extracts a part containing the moving object from the all-around image, and transmits the extracted part as the clipped image.

12. The image capturing system according to claim 2, wherein the camera control device further comprises an image recognizer that performs recognition processing on the moving object in the received clipped image, and the selector selects the at least one camera suitable for the recognition processing.

13. The image capturing system according to claim 3, wherein the camera control device further comprises an image recognizer that performs recognition processing on the moving object in the received clipped image, and
the selector selects the at least one camera suitable for the recognition processing.

14. The image capturing system according to claim 1, wherein the evaluation value of the tilt of the moving object relative to the camera obtained by the generator has a substantially constant value when an angle of the tilt is between a threshold angle and 90 degree, the threshold angle being greater than 0 degree and smaller than 90 degree.

15. The image capturing system according to claim 14, wherein the evaluation value increases as the angle of the tilt increases from 0 degree to the threshold degree.

16. The image capturing system according to claim 15, wherein the selector selects at least one camera from the plurality of cameras such that a camera with a higher evaluation value of the tilt has a higher possibility to be selected as the at least one camera.

17. The image capturing system according to claim 16, wherein
the generator further transforms the position of the moving object into an evaluation value of a distance between the moving object and the camera, based on the relationship between the position of the moving object and the center of the all-around image,
the generator further obtains an evaluation value of a horizontal angle of the moving object, the horizontal angle being defined by an orientation of a face of the moving object with respect to the camera, and
the selector selects the at least one camera having a highest total evaluation value, which is based upon combining the evaluation value of the tilt, the evaluation value of the distance and the evaluation value of the horizontal angle.

* * * * *